July 6, 1965  H. A. CLOUD  3,192,665
SELF-REGULATORY FLOWER POT
Filed Dec. 19, 1962

INVENTOR
HAROLD A. CLOUD
BY
ATTORNEY

3,192,665
SELF-REGULATORY FLOWER POT
Harold A. Cloud, 465 Lovell, St. Paul 17, Minn.
Filed Dec. 19, 1962, Ser. No. 245,851
3 Claims. (Cl. 47—38.1)

This invention relates to a device to provide a controlled moisture tension within a growing mediuim, the device being self-regulatory in preferred operation, and providing a feature whereby aeration of the soil may occur as a portion of the regulatory process.

In the more usual construction, the device includes a receptacle for a growing medium such as a flowerpot, seed bed, and the like in conjunction with a liquid reservoir which may be integrally attached to the receptacle, the reservoir having a porous liner in contact with the growing medium through which the liquid in the reservoir may transfer to the growing medium as required by the plant.

A growing medium having plants growing therefrom requires a supply of water for the growth of the plant in addition to other plant requirements. As the growing medium loses moisture due to evaporation and transpiration, the amount of moisture present in the growing medium is reduced. As the amount of moisture is reduced, the moisture tension of the growing medium increases, and the plant in order to obtain moisture, must exert a greater attraction or tension for the moisture than the moisture tension of the growing medium. The operation of the present device utilizes this principle of moisture tension. As one illustration of construction, the porous liner of the reservoir is placed in contact with the growing medium. The reservoir is closed to the atmosphere, and has at least one inlet means closable air tight with a stopper means through which the reservoir may be filled with a liquid. The reservoir is adapted to support a partial vacuum. As moisture tension of the growing medium increases, liquid is transferred through the pores of the porous wall in contact with the growing medium. As water is transferred from the closed reservoir, the partial vacuum is induced in the reservoir.

Water continues to transfer through the porous liner until the vacuum tension of the reservoir and the moisture tension of the growing medium are in equilibrium. As will be evident, the vacuum in the reservoir will gradually increase as liquid is transferred. The maximum reservoir vacuum is controlled through use of a porous liner having at least one portion of the liner of larger pore size than the rest. As the vacuum tension of the reservoir increases, the capillary moisture sealing the pores of the porous liner will break down, this breakdown occurring first at the location of the larger pores. Air is then drawn through the growing medium, then through the porous liner at the location of the larger pores, and into the reservoir. This maintains the vacuum at this level and the liquid will continue to be transferred to the growing medium through portions of the porous liner having smaller pores, in response to the moisture tenison of the growing medium.

An object of the present invention lies in a device to maintain the moisture level of the growing medium requiring a minimum of attention, and adapted to fulfill its function without the necessity of daily care and attention.

The particular object of the present invention lies in a device to be usable for small growing units such as flower pots and equally satisfactory for use with soil beds, seed trays, and the like of large producers.

A further object lies in a device serving not only to keep the moisture tenison of the soil or other growing media at a relatively constant growing level, but in addition, providing a means of aeration of the soil.

A further object of the invention is to provide a means of transferring moisture to the soil which will alleviate the problem of soil compaction and lack of aeration. Since in normal watering of plants and the like, the soil tends to compact, it is obvious that my invention will alleviate this problem. Further, by my method of introducing moisture to the soil, the porosity of the soil serves to keep the soil serated, and the soil is further aerated in the self-regulatory controlling of the vacuum tension of the reservoir.

It is a further object of the present invention to provide a controllable feature of aeration and moisture transfer through the location and size of the pores of the nonuniform porous liner. As will be understood, the amount of vacuum which will be maintained in the reservoir can be controlled through the size of the largest pores used. Positioning of the areas of the porous liner having the larger pores will provide the feature of aeration of all or only a portion of the growing medium as desired.

It will be further obvious that in multi-bed use, the reservoir may be placed at a central location and separate liners with suitable connections to the reservoir placed in contact with the growing medium. Other modifications are readily apparent and will be obvious to the operator.

A further object is to provide a device which is simple to operate and which does not require technical skill or knowledge on the part of the operator, the device being inexpensive and functionally sound.

It is a further object to provide a means of determining whether the device is functioning through a variety of means. For example, a vacuum gauge or other similar device may serve the purpose. A resilient hollow bulb of rubber or other suitable material serving as the stopper has been effectively used. In the presence of a vacuum the bulb partially collapsed indicating operation of the device.

These and other objects and features will appear from the following description taken in connection with the drawings herein in which.

The drawings illustrate one form of construction and are for the purpose of explaining the operation of the invention, the intent not being, however, to limit the applicaion embodied in the invention to this particular form of construction alone.

The invention is concerned with the supplying of moisture to a growing medium through specialized transfer unit in connection with a reservoir, the transferring unit being in contact with a growing medium. The reservoir may be a portion of the receptacle for the growing medium in one construction, and may be distantly spaced from the growing medium with supply line to the transferring unit in another construction.

Figures 1, 2:
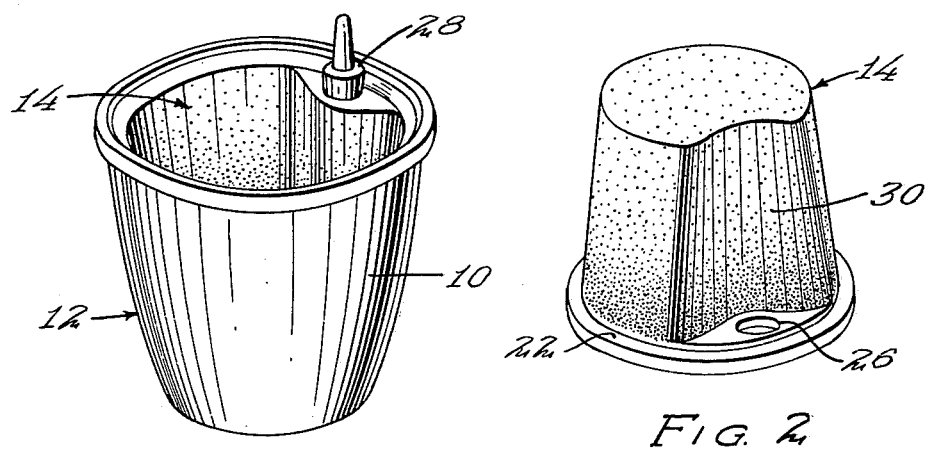
FIGURE 1 is a perspective view of one form of a combination receptacle and reservoir in the shape of a flower pot and illustrating one type of operating indicator.
FIGURE 2 is a perspective view of an inverted inner porous liner cooperable with the construction of FIGURE 1.

FIGURE 1 illustrates a flower pot type of receptacle, which is numbered 10. The outer shell 12 of the pot 10 may be made of a transparent, relatively rigid material such as glass, plastic, and the like which may be decoratively painted or imprinted depending on the preference of material.

Figure 3:
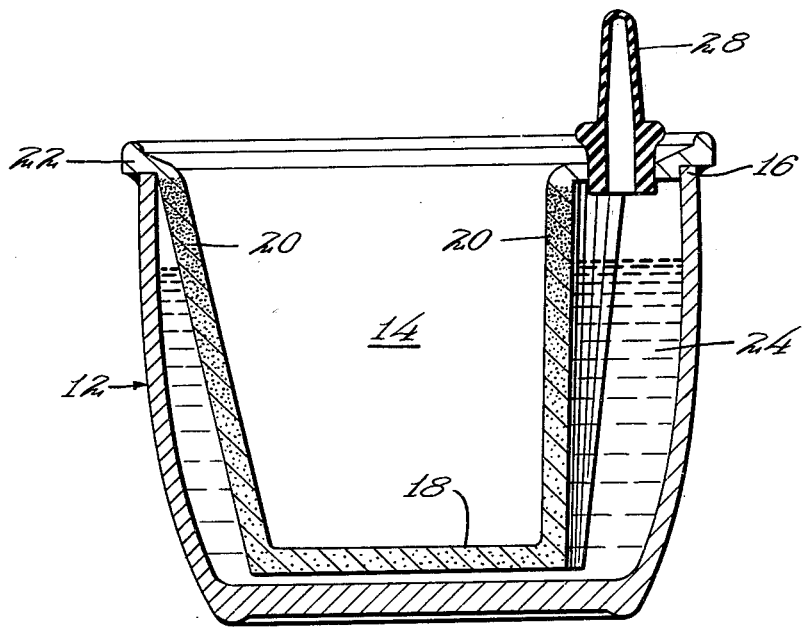
FIGURE 3 is a cross section of the assembled reservoir-receptacle.

The pot 10 shown comprises an outer shell 12 and an inner liner 14. The outer shell 12 being of relatively rigid construction and having a circular bottom an upstanding side to provide a bowl or pot shape. The shell 12 may be transparent so that the contents within the shell 12 are visible. The shell 12 has a circular rim 16 designed to sealably engage with the lip of the liner 14. The liner 14 in preferred construction is a non-uniform porous wall of a shape to cooperably conform with ends spaced inwardly from the outer shell 12. The liner 14 has some portions of the liner of a larger porosity than the other portions of the liner. In the preferred construction, the liner portion of larger pores is shown in FIGURE 3 and is numbered 18. This portion 18 of larger pore size may be a localized area or comprise the entire area of a portion of the liner as preferred. The liner 14 has upstanding sides 20 which may be relatively uniform in porosity. The upper edge of the liner 14 has a lip portion 22 designed to overlie and sealably engage the rim 16 of the shell 12 in preferred construction.

As previously mentioned, the liner 14 is spaced inwardly from the shell 12 to provide a space therebetween to serve as a reservoir for liquids such as water and the like, the reservoir being generally numbered 24.

Inlet means 26 are provided to the interior of the reservoir 24 through the lip 22. In preferred construction of the flower pot 10 illustrated in the drawings, the lip 22 of the liner 14 has an aperture 26 therethrough to provide access to the reservoir 24 so that the reservoir 24 may be filled with a liquid. Other locations for the inlet will be obvious to the skilled workman.

The rim 16 of the shell 12 engageably seals air tight against the lip 22 of the liner 14 to close the reservoir 24 to the atmosphere. After the reservoir 24 is filled with a liquid, a stopper 28 is inserted into the aperture 26 to seal the inlet to the atmosphere. In preferred construction the stopper 28 may be a collapsible hollow rubber bulb to provide an indicator of the presence of a partial vacuum in the reservoir 24, and that the device is in operation. It will be understood that the vacuum indicator may be of other suitable types such as gauges although only one vacuum indicator has been described in some detail. As will be understood the reservoir 24 is designed to support the vacuum within predetermined limits, the presence of a partial vacuum within the reservoir being indicated by a partial collapsing of the bulb stopper 28. Where other forms of vacuum indicators are used, the presence of the vacuum may be shown by means of gauges and the like. A growing media for plants, seeds, and the like, is placed in contact with the porous liner 14. The growing medium can be any suitable growing material for plants, seeds, and the like, such as soil, sand, vermiculite, other mineral products, and combinations thereof as desired. The growing media (not shown) is placed in the pot 10 in contact with the liner 14. At the time of planting, the growing media is normally watered. As the growing media loses moisture through evaporation from the growing media and transpiration from the plants, the moisture tension increases and the plant must obtain moisture from the growing media against a constantly increasing moisture tension.

In the present invention, as the moisture tension in the growing media increases, liquid is drawn from the reservoir 24 through the porous liner 14 into the growing media. At the same time the reservoir is filled with a liquid and thereafter stoppered, the vacuum tension as it might be called is zero within the reservoir. As the water transfers from the reservoir to the growing media through the liner 14, the level of water within the reservoir is lowered. The resultant space due to the transfer of water is occupied by the air which was initially present within the closed reservoir at the time it was stoppered; the accompanying increase in volume of this air creates a partial vacuum within the reservoir 24. The presence of this vacuum is indicated by partial collapse of the bulb stopper 28.

Water will continue to transfer through the liner 14 until the vacuum tension within the reservoir 24 and the moisture tension of the growing media are in equilibrium. As additional moisture is lost from the growing media, the moisture tension of the growing media will increase causing additional transfer of liquid from the reservoir 24 through the porous liner to the growing media. So long as the vacuum tension of the reservoir and moisture tension of the growing media are in equilibrium, further transfer will not occur. This provides a supply of liquid at a controlled tension to the growing media; the liquid being transferred to meet the demands of the plant as indicated by the moisture tension of the growing media. It is obvious that close attention to the growing plants or seedling is not required since liquid will be supplied as needed.

It is apparent that the size of the pores in the area of the larger pore size, of the porous liner 14 will provide a control feature as to the vacuum tension that will be maintained within the reservoir. The larger the pores in this area of the liner 14, the lower the vacuum at which the reservoir 24 will be maintained. In other words, the control level of the vacuum in the reservoir 24 at which the reservoir liquid is movable through the porous liner 14 in response to the moisture tension of the growing media is determined by the pore size of the non-uniform portions of the porous liner 14.

When the vacuum tension of the reservoir 24 reaches the value determined by the size of the larger pores contained in the liner, an aeration process of the growing media takes place. As will be understood, liquid normally fills the pores of the liner 14, the liquid providing an air sealing film. As the vacuum tension in the reservoir 24 reaches the desired control level, the liquid film breaks down, this breakdown occurring first in the portion of the liner having the largest pores. As the film breaks, air is drawn through the growing media and into the reservoir through the porous liner at the point of film breakdown until the vacuum tension and moisture tension are once again in equilibrium.

It should be understood that various shapes of reservoirs having porous liners may be used as long as at least a portion of the porous liner is in contact with the growing media. The reservoirs may be elongated so as to accommodate a seed bed, for example, or designed for one plant as in the case of the illustrated flower pot 10.

Preferred construction calls for at least a portion of the porous liner 14 to underlie the growing media, with the area of largest pores in the liner 14 underlying and in contact with the growing media. This construction is preferable to that of a uniformly porous liner since a prelocated point of film breakdown is provided and aeration of the soil may thus occur.

As indicated in FIGURE 2, the liner 14 of the flower pot 10 may be flattened on one side as indicated at 30 to increase the capacity of the reservoir 24, and provide space for a fill hole 26. At least an upper faced portion of the liner 14 and lip 22 may be an enamel coated or glazed finish which is easy to clean, and through which air will not pass. This feature is of importance in that a portion of the liner 14 is provided above the surface of the growing media which is attractive and which also prevents unnecessary evaporation.

It will be further understood that air will not normally pass through other portions of the porous liner 14 because of the presence of capillary liquid in the pores. However, liquid will move through these areas of the porous liner from the reservoir to the growing media in response to moisture tension differential between the growing media and the liquid reservoir. The air impermeability of the liner at these portions of the porous liner may be increased by reducing the pore size.

It is obvious that the principle of construction embodied in the invention enables the operator to provide many modifications based on the underlying transfer principle, such as for example, the practice of using the central reservoir and supply lines from the central reservoir and supply lines from the central reservoir having porous liners at their extremity in contact with the growing media.

While I have provided one illustration showing a combined reservoir and receptacle, it is obvious that the spirit of the invention includes the broad concept wherein the reservoir need not be the receptacle for the growing media, and while I have set forth the best embodiments of my invention in principle, I desire to have it understood that obvious changes may be made within the scope of the following claims without departing from the spirit of my invention.

I claim:

1. A device for controlling the moisture tension of a growing media adapted for the growing of plants and the like comprising:
   (a) a closed reservoir for liquids such as water,
   (b) said reservoir including an impermeable outer shell and an inner open topped liner attached together in fluid tight relationship adjacent the upper edges of the liner to form a reservoir therebetween,
   (c) said reservoir including an inlet communicating with the reservoir and through which the reservoir may be filled with a liquid,
   (d) removable stopper means normally sealing said inlet to the passage of air or liquid therethrough,
   (e) said liner being adapted to contain a growing media therein,
   (f) the portions of said shell and liner adapted to be exposed when said growing media is in place being substantially air impervious,
   (g) portions of said liner adapted to be in contact with said growing media being porous,
   (h) said pores being of such size that liquid in said reservoir will not flow through said pores of said liner when pressure is equal on both sides of said liner,
   (i) said porous portion of said liner including an area adjacent said growing media of larger pore size than the remainder thereof,
   (j) said growing media being adapted to have a moisture tension resulting from the evaporation and consumption of liquid from said media,
   (k) said reservoir being adapted to maintain liquid in said reservoir under vacuum tension,
   (l) whereby said liquid in said reservoir may move from said reservoir to the growing media when the moisture tension in said growing media is greater than the vacuum tension in said reservoir.

2. The structure of claim 1 and in which the size of the pores in said larger pore size area determine the control level of the vacuum in said reservoir at which the liquid is moveable through the porous portions of said liner in response to the moisture tension of the growing media.

3. A device for controlling the moisture tension of a growing media adapted for the growing of plants and the like comprising:
   (a) a receptacle adapted to contain a growing media,
   (b) said receptacle having an impermeable outer shell and a non-uniformly porous liner of a cooperative conformation to said outer shell spaced from said outer shell to define a reservoir,
   (c) said liner and shell having peripheral edges sealably joined to close said reservoir to the atmosphere,
   (d) said reservoir having an inlet through which said reservoir is adapted to be filled with a liquid,
   (e) removable stopper means normally in said inlet to prevent passage of air and liquid from said reservoir inlet,
   (f) said liner including a bottom having areas of larger pore size than other portions of said liner,
   (g) a growing media in said receptacle,
   (h) at least a portion of said larger pore area being beneath and in contact with said growing media,
   (i) said liquid in said reservoir filling the pores of said porous liner to produce an air sealing film of moisture,
   (j) said growing media exerting a moisture tension whereby said liquid in said reservoir is drawn through said porous liner in contact with said growing media into said growing media whenever said moisture tension is greater than the vacuum tension in said reservoir until said moisture tension and said vacuum tension are in equilibrium,
   (k) said pores being of such size that liquid in said reservoir will not flow through said pores of said liner when pressure is equal on both sides of said liner.

References Cited by the Examiner

UNITED STATES PATENTS

| 1,214,356 | 1/17 | Natvig | 47—34.1 |
| 2,344,794 | 3/44 | Vallinos | 47—38 |
| 2,655,894 | 10/53 | Rabbit | 116—117 |

FOREIGN PATENTS

| 496,138 | 10/50 | Belgium. |
| 1,208,813 | 9/59 | France. |
| 9,518 | 11/42 | Great Britain. |

T. GRAHAM CRAVER, *Primary Examiner.*